(12) United States Patent
Schlegel et al.

(10) Patent No.: US 8,480,129 B2
(45) Date of Patent: Jul. 9, 2013

(54) STEERING COLUMN FOR A MOTOR VEHICLE

(75) Inventors: Markus Schlegel, Sevelen (CH); Felipe Segatto, Trübbach (CH); Stefan Mützner, Feldkirch (AT); Nicolas Jacques, Wildhaus (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/320,620

(22) PCT Filed: May 5, 2010

(86) PCT No.: PCT/AT2010/000145
§ 371 (c)(1),
(2), (4) Date: Dec. 13, 2011

(87) PCT Pub. No.: WO2010/129973
PCT Pub. Date: Nov. 18, 2010

(65) Prior Publication Data
US 2012/0074678 A1    Mar. 29, 2012

(30) Foreign Application Priority Data
May 15, 2009   (DE) .......................... 10 2009 021 579

(51) Int. Cl.
*B62D 1/19*   (2006.01)
(52) U.S. Cl.
USPC ........................................................ 280/777
(58) Field of Classification Search
USPC ........................................................ 280/777
See application file for complete search history.

(56) References Cited

U.S. PATENT DOCUMENTS 3,785,671 A * 1/1974 Salewsky .................. 280/777
3,868,864 A * 3/1975 Durkee et al. ................ 74/492

(Continued)

FOREIGN PATENT DOCUMENTS

| DE | 23 63 895 | 7/1975 |
| DE | 600 27 521 | 12/2006 |

(Continued)

OTHER PUBLICATIONS

International Search Report issued Aug. 25, 2010 in International (PCT) Application No. PCT/AT2010/000145.

(Continued)

*Primary Examiner* — Nicole Verley
(74) *Attorney, Agent, or Firm* — Wenderoth, Lind & Ponack, L.L.P.

(57) ABSTRACT

A steering column for a motor vehicle comprises a casing unit, which serves to rotatably mount a steering spindle section adjoining a steering-wheel-side end, and at least one support piece which can be fastened at one side to a motor vehicle part fixed with respect to the body and which is or can be fixedly connected at the other side to the casing unit. At least one rupturing region is formed, along which, when a displacement force which exceeds a predefined release force acts in the direction of the longitudinal axis of the steering spindle section adjoining the steering-wheel-side end, the connection of the support piece to the casing unit or the support piece can be ruptured, wherein a displacement of the casing unit relative to the part fixed with respect to the body takes place.

18 Claims, 6 Drawing Sheets

U.S. PATENT DOCUMENTS

| | | | |
|---|---|---|---|
| 3,980,314 A | 9/1976 | Köpf | |
| 4,627,306 A * | 12/1986 | Berenjian | 74/492 |
| 4,703,669 A * | 11/1987 | Hyodo | 74/492 |
| 4,733,575 A * | 3/1988 | Nakamura | 74/493 |
| 4,991,871 A | 2/1991 | Sadakata | |
| 5,209,135 A * | 5/1993 | Ichikawa | 74/492 |
| 5,230,533 A * | 7/1993 | Yamaguchi | 280/775 |
| 5,497,675 A * | 3/1996 | Brown et al. | 74/492 |
| 5,738,377 A * | 4/1998 | Sugiki et al. | 280/777 |
| 5,857,703 A * | 1/1999 | Kinoshita et al. | 280/775 |
| 5,875,686 A * | 3/1999 | Kinoshita et al. | 74/492 |
| 6,237,955 B1 * | 5/2001 | Sato et al. | 280/777 |
| 6,279,953 B1 * | 8/2001 | Cartwright | 280/779 |
| 6,394,241 B1 * | 5/2002 | Desjardins et al. | 188/376 |
| 6,799,779 B2 * | 10/2004 | Shibayama | 280/777 |
| 7,188,867 B2 * | 3/2007 | Gatti et al. | 280/777 |
| 7,264,274 B2 * | 9/2007 | Ridgway et al. | 280/777 |
| 7,311,333 B2 * | 12/2007 | Sato et al. | 280/777 |
| 7,384,070 B2 * | 6/2008 | Sato et al. | 280/777 |
| 7,472,924 B2 * | 1/2009 | Ikegaya et al. | 280/777 |
| 7,651,132 B2 * | 1/2010 | Cho et al. | 280/777 |
| 7,669,500 B2 * | 3/2010 | Matsui et al. | 74/493 |
| 7,798,526 B2 * | 9/2010 | Lopez et al. | 280/777 |
| 7,866,699 B2 * | 1/2011 | Levin et al. | 280/777 |
| 2002/0026848 A1 * | 3/2002 | Kurita | 74/493 |
| 2005/0167962 A1 * | 8/2005 | Sato et al. | 280/775 |
| 2006/0186658 A1 * | 8/2006 | Yasuhara et al. | 280/775 |
| 2006/0214411 A1 * | 9/2006 | Ikegaya et al. | 280/777 |
| 2006/0290128 A1 * | 12/2006 | Ridgway et al. | 280/777 |
| 2008/0236326 A1 * | 10/2008 | Matsui et al. | 74/493 |
| 2008/0272583 A1 * | 11/2008 | Lopez et al. | 280/777 |

FOREIGN PATENT DOCUMENTS

| | | |
|---|---|---|
| EP | 1 094 240 | 4/2001 |
| EP | 1 707 471 | 10/2006 |
| EP | 1 839 994 | 10/2007 |
| EP | 1 975 037 | 10/2008 |
| JP | 10-217981 | 8/1998 |

OTHER PUBLICATIONS

German Search Report issued Apr. 1, 2010 in German Priority Application No. 10 2009 021 579.4.

* cited by examiner

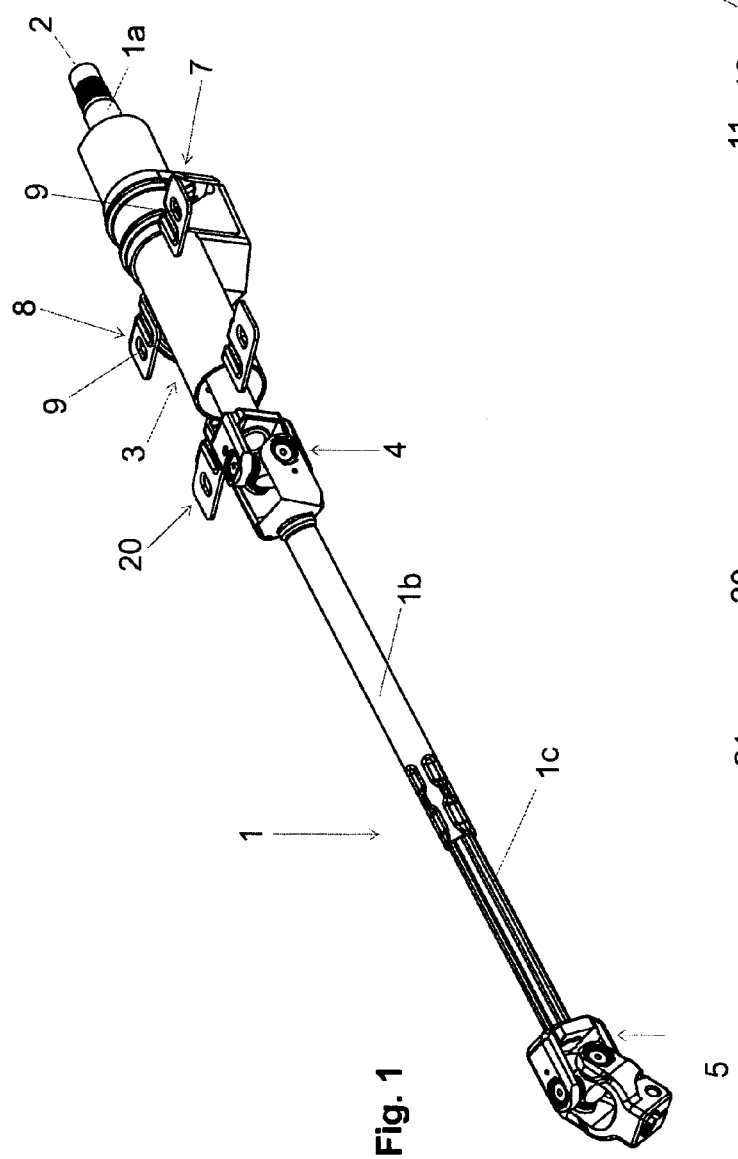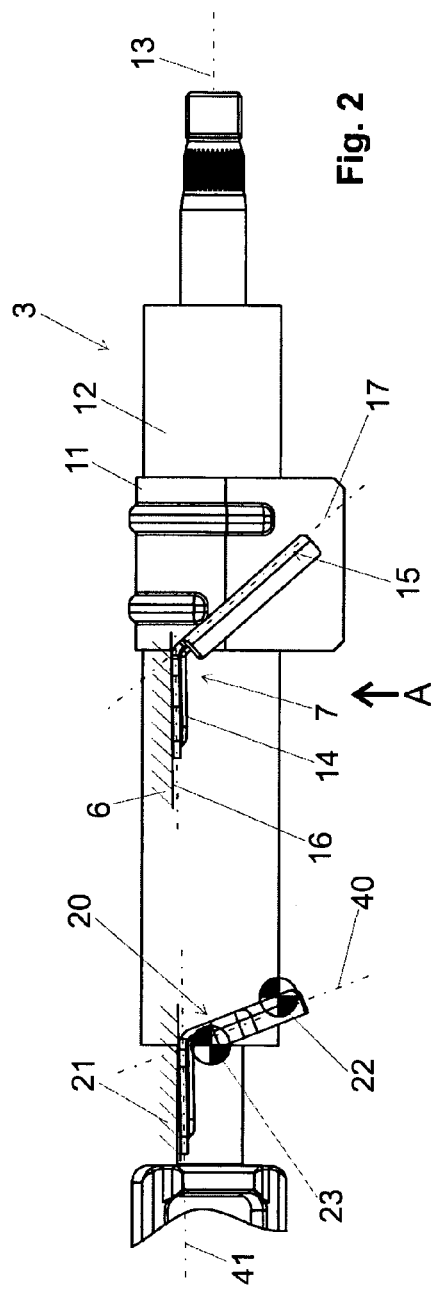

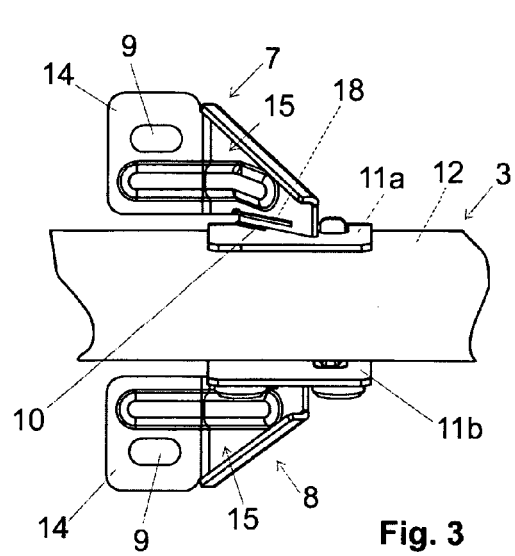
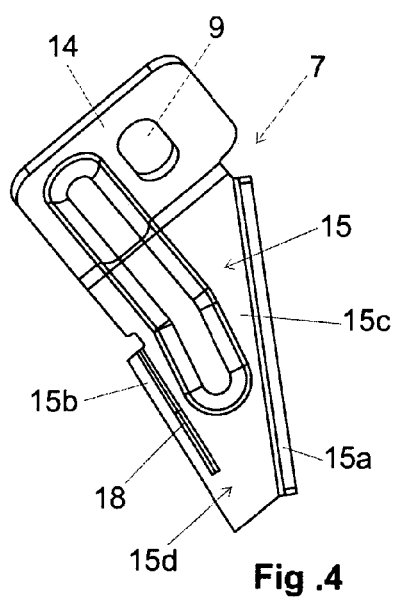
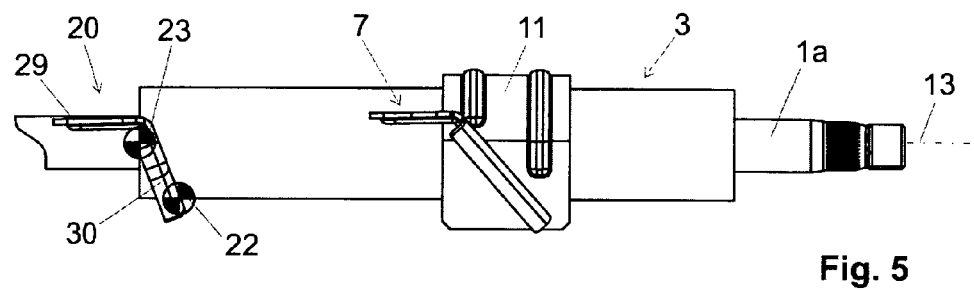
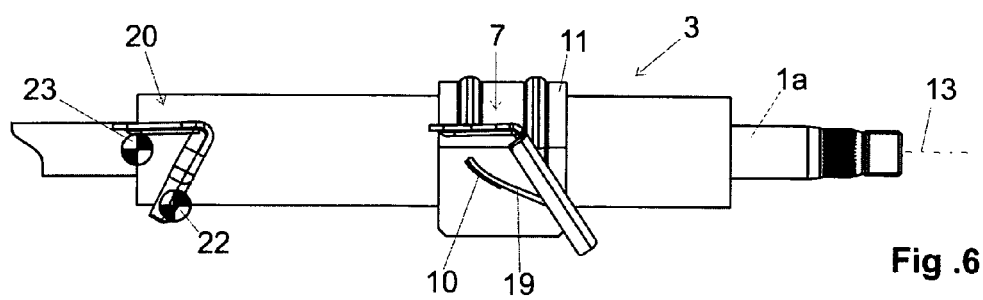

STEERING COLUMN FOR A MOTOR VEHICLE

BACKGROUND OF THE INVENTION

The invention relates to a steering column for a motor vehicle, comprising a jacket unit by which a section adjoining a steering wheel-side end of a steering spindle is rotatably supported, and at least one support unit, which, on the one hand, is securable in position on an automobile body-stationary part of the motor vehicle and which, on the other hand, is fixedly connected or fixedly connectable with the jacket unit.

Steering columns which, in the event of a motor vehicle crash, are collapsible one into the other with the absorption of energy in order to lower the risk of injury to the driver, are known in various embodiments. For the adaptation of the seating position at different sizes of the driver, steering columns are frequently utilized that are adjustable in length and/or inclination or height. For reasons of cost, however, simpler nonadjustable steering columns are also employed, which are also said to be collapsible in the event of a crash with the absorption of energy.

U.S. Pat. No. 4,991,871 A discloses, for example, a nonadjustable steering column in which the steering spindle as well as a jacket unit rotatably (bearing) supporting the steering spindle comprise each two sections telescopable with respect to one another. In the event of a crash, the section of the jacket unit closer to the driver is torn out of the vehicle-stationary mounting and, with the exhaustion of energy, is pressed into the section of the jacket unit further removed from the driver. Such an implementation is complex and cost-intensive.

DE 2 363 895 A1 also discloses a nonadjustable steering column in which, in the event of a crash, the jacket unit rotatably supporting a section of the steering spindle is torn out of a vehicle-stationary mounting and pressed against a deformation member, for example a corrugated tube, wherein energy is absorbed. Due to the additionally required energy absorption part, this device is also relatively complex.

An adjustable steering column with an energy absorption mechanism for the event of a crash is disclosed in JP 102 179 81 A. In the closed state of a securement device.

A jacket unit rotatably supporting the steering spindle is fixedly connected with a holding unit. The holding unit comprises a first body-stationary part and a second part which, in the closed state of the securement device, is secured nondisplaceably with respect to the jacket unit. In the event of a crash, the second part of the holding unit can separate from the first part and be dislocated together with the jacket unit in the direction toward the vehicle front. Between the first and the second part of the holding unit is disposed an energy absorption part which, by tearing open along a tear line, absorbs energy in the dislocation of the jacket unit in the direction toward the motor vehicle front.

A similarly implemented energy absorption mechanism is also disclosed in EP 1 707 471 A1 and EP 1 839 994 A2. In each instance between two separate parts of the holding device is a separate energy absorption part. One of the two separate parts is body-stationary and the other part is connected nondisplaceably with the jacket unit. In normal operation, the parts are connected with one another and, in the event of a crash, they can become detached from one another.

In view of the multi-part implementation of the holding units and the separate energy absorption parts, these devices are relatively complex to implement.

SUMMARY OF THE INVENTION

The invention addresses the problem of providing a simply implemented steering column of the above described type with an energy absorption mechanism for the event of a crash. This is achieved according to the invention through a steering column which will be described below. Advantageous further developments of the invention are also described.

In a steering column according to the invention, thus, at least one support unit is provided which, in the mounted state of the steering column is, on the one hand, secured on a body-stationary part of the motor vehicle, on the other hand, with the jacket unit. In the event of the implementation as a nonadjustable steering column, it is fixedly connected. In the event of implementation as an adjustable steering column, it is fixedly connectable. At least one tear region is formed. In the event of an action of a displacement force oriented parallel to the steering spindle, which force exceeds a predefined detachment force as may occur in a vehicle crash, the connection of the support unit with the jacket unit or the support unit is tearable along the tear region. As a result, a dislocation of the jacket unit with respect to the body-stationary part on which the support unit is attached occurs.

Without the effect of a displacement force in the direction of the longitudinal axis of the section adjoining the steering wheel-side end the steering spindle, which force exceeds the predefined detachment force (thus in normal operation when no crash has occurred), the tear region is directly within the force flow between the body-stationary part of the motor vehicle and the jacket unit for receiving the holding forces of the jacket unit.

In the event of a crash, when the displacement force oriented parallel to the steering column exceeds the predefined detachment force, the tearing of the tear regions advantageously takes place continuously at least over a large portion of the displacement path of the jacket unit with respect to the body-stationary part.

This tear region is preferably implemented in the support unit itself. The tear region can herein be implemented in particular as a tear line formed in the support unit along which the support unit is tearable in the event of an action of the displacement force which exceeds the predefined detachment force. In an alternative embodiment, the tear region can be implemented as a rupturable securement for the securement of the jacket unit on the support unit. The two measures (at least one tear line in the support unit or rupturable securement of the support unit on the jacket unit) can also be applied in combination with one another.

At least one support unit which serves for securing the steering column on a body-stationary part of the motor vehicle is thereby directly included as an energy absorption part and during the tearing also enables a dislocation of the jacket unit of the steering column in the direction toward the motor vehicle front. In the manner according to the invention, very simply a yieldingness of the steering column with the absorption of energy can be produced. The energy absorption herein takes place by tearing open (=separation energy). Furthermore, an energy absorption through deformation (bending) of the support unit can preferably take place.

The dislocation, occurring in the event of a crash through the impact of the driver, of the jacket unit in the direction toward the vehicle front is herein preferably substantially oriented parallel (preferably with a departure of less than 20° from the parallel) to the longitudinal axis of the section of the steering spindle rotatably supported by the jacket unit.

In the production of the tear region as a tear line in the proximity of the at least one tear line, the material of the support unit is weakened, such that under a sufficiently high force acting in the sense of tearing (=a predefined detachment force) defined tearing open along the weakened line takes place. The tear line can advantageously be formed by a linear notching, which can be formed advantageously by stamping during the production of the support unit. The support unit is preferably implemented as a sheet metal flexure part or as sheet metal stamped flexure part, whereby cost-effective production is made possible.

Analogously, in the production of the tear region as a rupturable securement, the securement is so dimensioned that the securement splits upon the occurrence of a predefined detachment force. Here also corresponding weakenings or notchings are advantageously provided in order to attain a controlled unbuttoning (=tearing open of a spot-shaped connection, for example, a spot welding connection) or splitting. All known securement methods can herein be applied. The securement preferably takes place through spot welding or riveting.

A crash event occurs if onto the steering wheel-side end of the steering spindle a force or a force component acts in the axial direction of the steering spindle, which force exceeds a predetermined limit value. This limit value represents the predefined detachment force starting at which the tearing region is torn open. The predefined detachment force is preferably at least 500 N.

It is preferred for the predefined detachment force to be maximally 10,000 N, especially preferably maximally 5,000 N and even more preferred maximally 3,000 N.

If within the scope of this publication the discussion refers to the statement that the support unit is "fixedly connected" or "fixedly connectable" with the jacket unit, this means that the connection of the corresponding section of the support unit with the jacket unit at least in normal operation, thus when no crash occurs, does not permit a displacement of the jacket unit with respect to the support unit. This nondisplaceable connection preferably is also retained in the event of a crash, preferably at least up to a predefined break-away force whose value is greater than the detachment force, and preferably has at least the twofold value of the detachment force.

The same applies to the securement of the support unit on the body-stationary part of the motor vehicle.

A dislocation of the jacket unit in the event of a crash in the direction toward the vehicle front is consequently enabled by the tearing-open along the at least one tear line and/or of the securement and the dislocation entailed therein of parts of the support unit. In addition, a further dislocation can be enabled for example by bending parts of the support unit toward one another. However, preferably even after the separation of the tear region, at least for the case that the acting force falls below the second break-away force, a connection is retained between the jacket unit, with the interconnection of the support unit, with the body-stationary part. This means that the support unit still has a connection to the jacket unit and also still a connection with the body-stationary part and in itself is not separated into two parts.

In an advantageous embodiment of the invention, the at least one support unit having at least one tear region comprises at least one first securement section which, in the mounted state of the steering column, is secured on the body-stationary part, and the first securement section is preferably in contact on the body-stationary parts. The tear region also comprises at least a second securement section, which—in the case of a nonadjustable steering column—is secured in position on the jacket unit, preferably directly (thus not via a separate part), or—in the case of the implementation of an adjustable steering column—is fixedly connectable with the jacket unit by closing a securement device, wherein it preferably is in contact on the jacket unit. This implementation is especially preferred in the case the tear region is formed by a tear line.

A feasible embodiment provides that on both sides on the jacket unit (on opposite sides referred to a vertical plane in which the axis of the steering spindle is located), one securement piece each, implemented preferably unitarily (thus not comprised of several separate connected parts) is secured in position, for example by welding, each of which securement piece includes at least one tear line.

In another embodiment of the invention, a preferably unitarily implemented support unit (=securement piece) can be provided, which comprises sections extending on two opposite sides of the jacket unit (referring to a vertical plane in which the longitudinal axis of the steering spindle is located, wherein this is, of course, referred to as the operating position of the steering column). Each of the sections is attached on the jacket unit, and each of the sections is provided with at least one tear line.

In a region of the steering column, further removed compared to the at least one support unit from the steering wheel-side end of the steering spindle, advantageously at least one further support unit is provided which, on the one hand, in the mounted state of the steering column is secured on a body-stationary part of the motor vehicle, on the other hand, is secured on a part of the steering column, preferably of the jacket unit. The securement on the steering column can, for example, also take place on an axially nondisplaceable, although rotatably disposed on the steering spindle, part separate from the jacket unit. This at least one further support unit can advantageously become deformed in the event of a crash when a dislocation of the jacket unit in the direction toward the vehicle front occurs. This deformation can also contribute to the energy absorption.

In an advantageous embodiment, the at least one further support unit is connected across at least two securement sites with the part of the steering column, preferably the jacket unit. At least one of these securement sites is implemented such that it can become detached in the event of a crash, and at least one of these securement sites is implemented such that it holds the connection even in the event of a crash. Thereby, on the one hand, increased stability for normal operation can be provided, on the other hand, a sufficiently large and easy deformability can be provided in the event of a crash. Also, guidance of the movement of the jacket unit can be attained in the event of a crash.

BRIEF DESCRIPTION OF THE DRAWINGS

Further advantages and details of the invention will be explained in the following in conjunction with the enclosed drawings, in which:

FIG. 1 shows an embodiment of a steering column according to the invention in oblique view, FIG. 2 shows the steering column of FIG. 1 in side view, FIG. 3 shows a section of the steering column in a view from below (line of sight A in FIG. 2), FIG. 4 is an oblique view of the upper support unit, FIG. 5 and FIG. 6 shows the comparison of the steering column before and after a motor vehicle crash (each in side view)

DETAILED DESCRIPTION OF THE INVENTION

Figure 7:
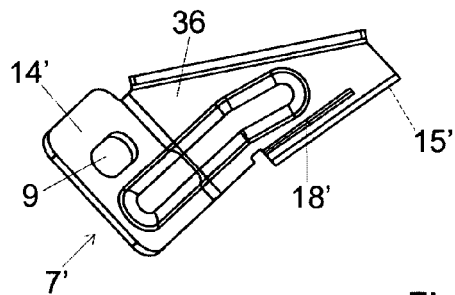
FIG. 7 is an oblique view of a support unit of a steering column according to a second embodiment.
Figure 8:
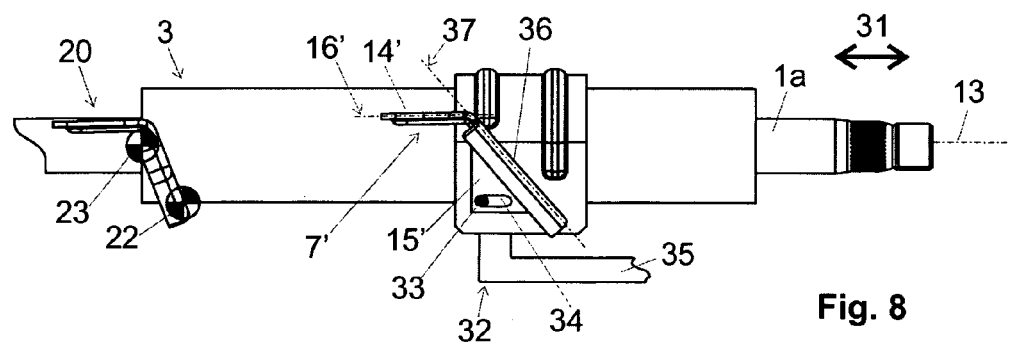
FIG. 8 and FIG. 9 are schematic depictions of different adjustment positions of the steering column in the direction of the length adjustment, in side view of the steering column.
Figure 9:
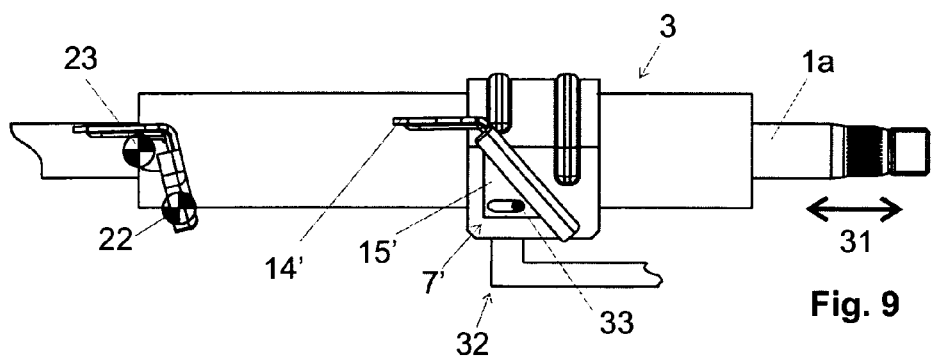

A first embodiment of a steering column according to the invention is shown schematically in FIGS. 1 to 6. The steering column comprises a steering spindle 1 of which a section 1a, adjoining a steering wheel-side end and having a longitudinal axis 13, is rotatably supported by a jacket unit 3 which can also be referred to as jacket tube. To enable in the event of a crash a dislocation of the section 1a, adjoining the steering wheel-side end, of the steering spindle 1 with respect to the body-stationary parts (body-side securement parts) 6, 21, the steering spindle 1 comprises two sections telescopable with respect to each other. These sections could be the section 1a adjoining the steering wheel-side end 2 and a section telescopable with respect to this section. In the depicted embodiment, the telescopability between two other sections 1b, 1c of the steering spindle is realized, of which the section 1b, closer to the steering wheel-side end, is connected with the section 1a via a universal joint 4. However, the displaceability can also be enabled by alternative measures, for example by a deformation, not shown here, of the steering spindle or by angular offsets (not shown here) in the steering shaft over several joint connections.

A further section of the steering column, which is connected with section 1c via a further universal joint 5, is not shown for the sake of simplicity.

For the mounting of the steering column on a body-stationary part 6 of the motor vehicle, which is only indicated in FIG. 2, serve the support units 7, 8. In normal operation, when no crash has occurred, at least a portion of the weight of the steering column is supported by these support units 7, 8. These support units 7, 8 are each secured, on the one hand, on the body-stationary part 6. For this purpose they include a bore 9 for the reception of a securement bolt (not shown in the Figures), via which the securement on the body-stationary part 6 takes place. On the other hand, in the embodiment, depicted in FIGS. 1 to 6, of a nonadjustable steering column each of the support units 7, 8 is directly fixedly connected with the jacket unit 3. This connection can be implemented, for example, by a weld seam 10 indicated in FIGS. 3 and 6. Other fixed connections, for example via riveting or bolting, between the jacket unit 3 and the support unit 7, 8 are also conceivable and feasible.

For the connection with the particular support unit 7, 8 the jacket unit 3 comprises a bowed connection bracket 11 which is secured in position, for example by welding, on a tube portion 12 of the jacket unit. On opposite sides of the jacket unit 3 (referring to a—based on the operating position of the steering column—vertical plane containing the longitudinal axis 13 of the section 1a of the steering spindle 1) the connection bracket 11 comprises side jaws 11a, 11b, on which the particular support unit 7, 8 is secured.

Different implementations of the jacket unit 3 are conceivable and feasible. For example, the jacket unit 3 could also be implemented in the form of a box, wherein the support units 7, 8 can be attached on opposing, vertically upright sides of this box-form profile. An implementation of the jacket unit 3 that is not closed is also conceivable and feasible; the jacket unit 3 could, for example, also have a U-shaped cross section with a side open downwardly.

The securement of the particular support unit 7, 8 on the body-stationary part 6 takes place on a first securement section 14 of the support unit 7, 8 that includes the bore 9. The fixed connection with the jacket unit 3 takes place on a connecting section 15b of the second securement section 15 of support unit 7, 8. Each of the first and the second securement sections 14, 15 have one main plane 16, 17, wherein these main planes 16, 17 form an angle. The angle formed by the main planes 16, 17 can be in the range of, for example, 110° to 150°. In the depicted embodiment, the angle is approximately 130°. Formation of this angle in the range of 90° (+/−20°) is also conceivable and feasible. In addition to the connecting section 15b, the second securement section 15 also comprises a base section 15c and a connection section 15d, which preferably all have the same main plane.

In this embodiment, the main plane 16 as well as also the main plane 17 are at right angles to a vertical plane which contains the longitudinal axis 13.

Figure 10:
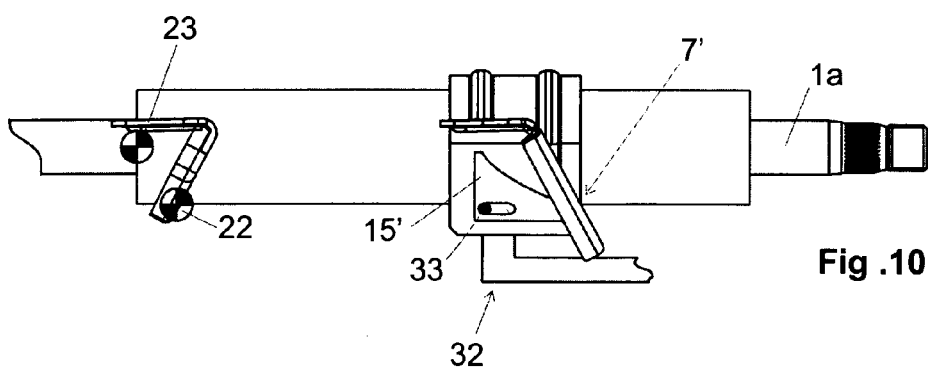
FIG. 10 is a schematic depiction corresponding to FIG. 8 after a vehicle crash.

The second securement section 15 of the particular support unit 7, 8 comprises a tear line 18, which is here formed by a notching. In the event of a crash, if onto the steering wheel-side end 2 of the steering spindle 1 acts a force directed parallel to the longitudinal axis 13 and oriented toward the motor vehicle front, or at least one such force component, which exceeds a particular predetermined limit value (the predefined detachment force), the particular support unit 7, 8 tears open along the tear line 18 with the simultaneous dislocation of the jacket unit 3 in the direction toward the vehicle front, with a torn-out tongue 19 being formed, cf. FIG. 6. The securement on the jacket unit 3 takes place in the proximity of the free end of this tongue. The other end of the tongue 19 that is not connected with the jacket unit 3 is connected with the support unit 7, 8. A portion of tongue 19, which adjoins the remaining portion of the support unit 7, 8, is not connected with the jacket unit 3. The jacket unit 3 remains in this manner connected via the support unit 7, 8 with the body-stationary part 6, although a dislocation of the jacket unit 3 with respect to the body-stationary part 6 has occurred. During the dislocation of the jacket unit 3 in the direction toward the vehicle front, the jacket unit 3 is also dislocated with respect to the first securement section 14 (secured in position on the body-stationary part 6) of the particular support unit 7. During the tearing along the tear line 18, energy is absorbed through the splintering work to be applied. It is preferably provided that through such work during the dislocation of the jacket unit 3 with respect to the body-stationary part 6, a mechanical bending deformation between the first and second securement sections 14, 14', 15, 15', 29, 30 of the support units 7, 7", 7", 8, 20 occurs, through which additional energy is absorbed. This is illustrated in FIGS. 6 and 10.

In the embodiment, the tear line 18 extends from a margin, for example in the proximity of a gradation of the second securement section 15 in the width of the second securement section 15 and runs in the direction toward the end, remote from the first securement section 14, of the second securement section 15. As shown, the tear line 18 is, for example, located in a vertical plane (referred to the operating position of the steering column) parallel to the longitudinal axis 13, wherein it can extend in particular at right angles to the bend or angled deflection via which the second securement section 15 is connected with the first securement section 14. The tear line thus forms the division of the securement section 15 into a connecting section 15*b* and a base section 15*c*. The length of the tear line 18 is advantageously limited such that a connection section 15*d* is formed between the connecting section 15*b* and the base section 15*c* of the securement section 15.

In this embodiment, the securement on the jacket unit 3 takes place in the connection section 15*d*, in particular in the proximity of the side margin of the second securement section 15 facing the jacket unit 3.

To increase the stability, the securement section 15 can include flanging 15*a*, cf. for example FIG. 4.

The support units 7, 8 are disposed on opposite sides (referred to a vertical plane containing the longitudinal axis 13) of the jacket unit 3 and specifically in the same region of the longitudinal extent of the steering column, thus there is at least one plane at right angles to the section 1*a* of the steering spindle 1, which plane intersects both support units 7,8. The two support units 7, 8 are preferably implemented such that they are mirror symmetrical.

In a region of the steering column which, compared to the support units 7, 8, is further removed from the steering wheel-side end 2, is disposed a further support unit 20. This is secured, on the one hand, on a body-stationary part 21, only indicated in FIG. 2, on the other hand, is secured on the jacket unit 3. The securement on jacket unit 3 takes place via first and second securement sites 22, 23, only shown schematically in FIGS. 2, 5 and 6, of which the at least one first securement site 23 is detachable in the event of a crash (cf. FIG. 6). For the securement on the body-stationary part 21 serve bores 24, 25 in sections, located on both sides of the jacket tube, of the further support unit 20, through which can be inserted securement bolts (not depicted in the Figures).

The further support unit 20 consequently comprises sections (referring to a vertical plane intersecting the longitudinal axis 13) on both sides of jacket unit 3. Instead, on each side of the jacket unit 3 a separate further support unit 20 could be provided, each of which is securable on the body-stationary part 21 and on the jacket unit 3 (for example each via two securement sites 22, 23).

Figure 14:
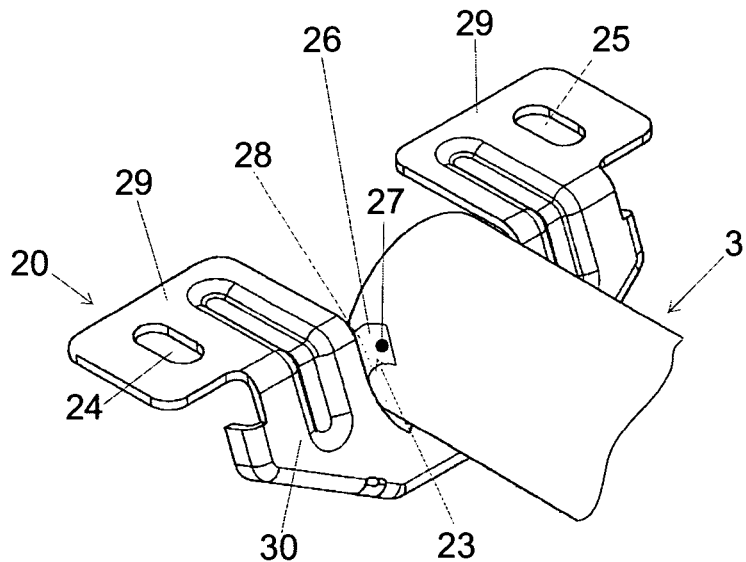
FIG. 14 and FIG. 15 show two minimally modified embodiments of securements of the jacket unit via a further support unit, in oblique view.
Figure 15:
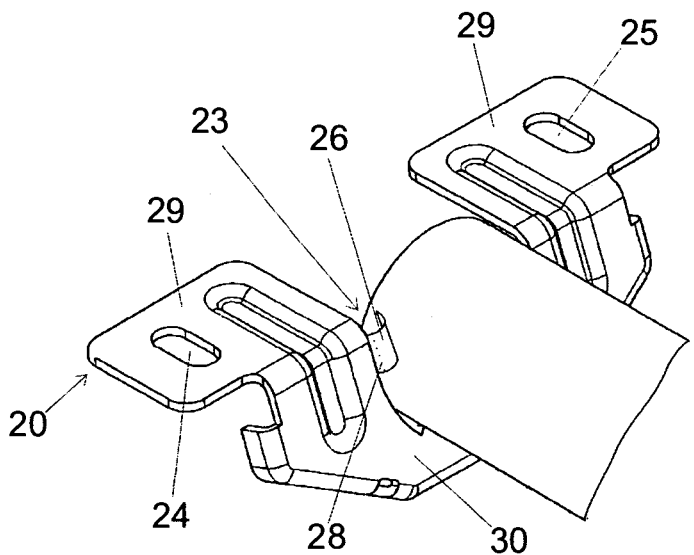

A feasible implementation of the first securement sites 23 is more precisely evident in FIGS. 14 and 15. As can be seen in FIG. 14, the sections of the support unit 20 located on both sides of the jacket unit 3 each have one connection tab 26 secured on the jacket unit 3, for example via welding (a weld spot 27 is evident in FIG. 14). The connection tab 26 is provided with a tear line 28 drawn in dotted lines, along which the material of the connection tab 26 is weakened, for example through notching.

If, in the event of a crash, onto the steering wheel-side end 2 of the steering spindle 1*a* force directed toward the vehicle front acts, which exceeds a predetermined limit value (the detachment force), the connection tab 26 is torn off, preferably along the tear line 28 (apart from the tearing of the support units 7, 8). However, alternatively the weld spot 27, or the correspondingly provided securement, can also be dimensioned such that upon a predetermined limit value being exceeded it is split for the displacement force.

The difference between FIGS. 14 and 15 is only that the connection tabs 26 in FIG. 14 are directed toward the steering wheel-side end 2 and in FIG. 15 toward the vehicle front.

The at least one second securement site 22 of the further support unit 20 on the jacket unit 3 is not visible in FIGS. 14 and 15. It is located in the proximity of the underside of jacket unit 3. The jacket unit 3 can here, for example, be welded to the further support unit 20.

The connection of the further support unit 20 with the jacket unit 3 via the at least one second securement site 22 is retained in the event of a crash, as is illustrated in FIG. 6 and for the second embodiment in FIG. 10. The dislocation of the jacket unit 3 in the direction toward the vehicle front is enabled through a deformation of the further support unit 20. The further support unit 20 comprises first securement sections 29, located on both sides (referring to a vertical plane in which is located the longitudinal axis 13) of the jacket unit 3 and via which the securement on the body-stationary part 21 takes place. For this purpose, the first securement sections in the depicted embodiment comprise bores 24, 25. The first securement sections 29 are connected via bends or angled deflections with a second securement section 30. The main plane 40 of the second securement section 30 is located at angles to the main plane 41 of the first securement section 29. This angle can be, for example, in the range from 80° to 160°. In a region, remote from the bends between the first securement section 29 and the second securement section 30, of the second securement section is located the at least one second securement site 22, via which the jacket unit 3 is secured on the further support unit 20 and which, in the event of a crash, is also retained, preferably at least up to a force acting in the direction of the longitudinal axis 13 which exceeds a predefined second break-away force. The second break-away force is preferably at least twice as large as the force at which the at least one first securement site 23 becomes detached.

When, in the event of a crash, the jacket unit 3 becomes dislocated in the direction toward the vehicle front, the angle between the first securement sections 29 and the second securement section 30 is decreased, cf. FIG. 6 and for the second embodiment example cf. FIG. 10. Two separate further support units 20 could also be provided, which are disposed on both sides of the longitudinal axis 13 and each of which comprises, for the securement on the body-stationary part 21, a first securement section 29 and, for the securement on the jacket unit 3, a second securement section 30. The at least one second securement site 22 would analogously be located in the proximity of the second securement section 30 (in a region remote from the bends or angled deflections).

In the unitary implementation as well as also in the implementation in multiple parts, the at least one first securement site 23 can be located in the proximity of the particular first securement section 29 or in the proximity of the (particular) second securement section 30.

The second securement section 15 of the particular support unit 7, 8 advantageously comprises, as depicted, a flanging 15*a* on its margin opposing the jacket unit 3.

A second embodiment of the invention is depicted schematically in FIGS. 7 to 10. The implementation corresponds to the previously described embodiment example with the following differences:

The steering column in this embodiment is implemented such that it is adjustable in the longitudinal direction 31 (in the direction of the longitudinal axis 13). To secure the set position of the steering column, an openable and closable securement device 32 is provided, which is only depicted in highly schematic form and only partially. In the opened state of the securement device 32, the jacket unit 3 can be adjusted in the longitudinal direction 31 with respect to the—referred to a vertical plane extending through the longitudinal axis 13—support units 7' (in FIGS. 7 to 10 only the support unit 7' disposed on the one side is depicted, the support unit disposed on the other side is mirror symmetrical). In the closed state of the securement device 32 the jacket unit 3 is retained nondisplaceably with respect to the support units 7'. The support units 7' are consequently fixedly connected with the jacket unit 3 in the closed state of the securement device 32 and thus are not displaceable in normal operation in the direction of the longitudinal axis 13. This connection, which is nondisplaceable in the direction of the longitudinal axis 13, is also retained in the event of a crash, at least up to a predetermined upper limit value of the force acting onto the steering wheel-side end 2 in the direction toward the vehicle front.

The securement device 32 comprises a clamp bolt 23 extending transversely to the longitudinal axis 13 and penetrating at least one hole in the jacket unit, by the margins of which it is retained such that it is nondisplaceable in the longitudinal direction 31, as well as also elongated holes 34 in the support units 7' extending in the longitudinal direction 31.

The support units 7' comprise again a first securement section 14' which serves for the securement of the particular support unit 7' on the body-stationary part. The first securement sections 14' can be implemented identically to the first securement sections 14 in the first embodiment.

For the fixed connection of the support unit 7' with the jacket unit 3 in the closed state of the securement device 32 serves a second securement section 15' of the particular support unit 7'. In the closed state of the securement device 32 this second securement section 15' is pressed against the particular side jaw 11*a*, 11*b* of the connection bracket 11. Thereby a securement under friction and/or form closure of the jacket unit 3 with respect to the support units 7' can be attained.

Pressing the second securement section 15' by the securement device 32 can take place in a conventional manner, for example through a cam disk rotated by rotation of the clamp bolt 33 about its longitudinal axis by means of an actuation lever 35, which cam disk cooperates with a cam follower disk. For the sake of simplicity these elements are not depicted in the Figures. Securement devices 32 implemented in the form of clamping mechanisms are known in many different embodiments.

The main plane of the second securement section 15' is here located in a vertical plane (referred to the operating position of the steering column) parallel to the longitudinal axis 13.

The second securement section 15' is connected across a connecting section 36 with the first securement section 14'. This connection section 36 can, for example, be entirely identical to the second securement section described in the first embodiment, only that it is not secured on its side margin facing the jacket unit 3 directly on the jacket unit 3 but rather is connected with the second securement section 15' via a bend or angled deflection.

The main plane 16' of the first securement section 14 and the main plane 37 of the connection section 36, consequently, form an angle as has been described in the first embodiment with respect to the main planes 16, 17. The main plane of the second securement section 15' is at right angles to the main planes 16', 37.

In the event of a crash, if the force (or this component of the force occurring in a crash) acting onto the steering wheel-side end 2 and directed in the direction of the longitudinal axis 13 toward the vehicle front exceeds the predetermined limit value, the connection section 36 tears along and into the tear line 18', wherein the jacket unit 3 is dislocated in the direction toward the vehicle front and thus also with respect to the first securement section 14' in the direction toward the vehicle front, cf. FIG. 10.

The further support unit 20 can be implemented in the same manner as in the first embodiment. The displacement of the steering column in the longitudinal direction 31 is herein absorbed through corresponding deformations of the further support unit 20. However, the further support unit 20 remains connected in the first securement site 23 and second securement site 22 with the jacket unit. To enable the dislocation of the second securement site 22, the second securement section 30 becomes bent with respect to the first securement sections 29. To enable the dislocation of the first securement sites 23 in the longitudinal direction 31, the connection tabs 26 are bent with respect to the main portion of the second securement section 30.

For example, the clamp bolt 33 could also penetrate the jacket unit 3 through at least one elongated hole oriented in the direction of the longitudinal direction 31 and round holes could be disposed in the support units 7', by whose margins it is retained nondisplaceably in the longitudinal direction 31.

Figure 11:
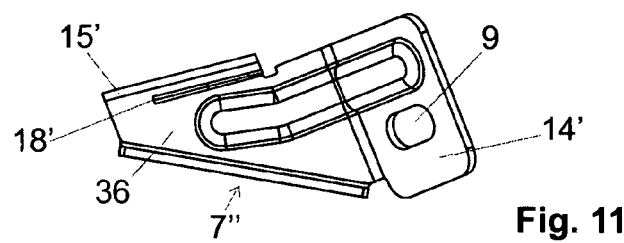
FIG. 11 is an oblique view of a support unit of a steering column according to a third embodiment.
Figure 12:
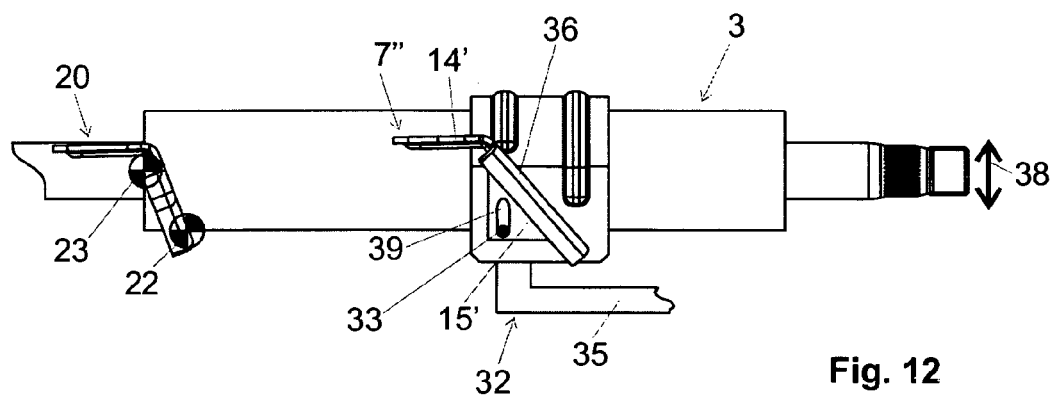
FIG. 12 and FIG. 13 are schematic side views of the steering column in different adjustment positions referring to the direction of height adjustment.
Figure 13:
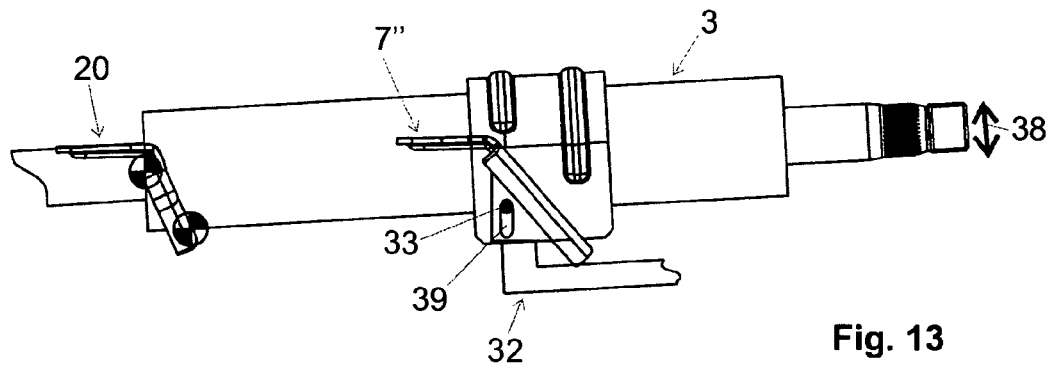

FIGS. 11 to 13 depict a third embodiment which, apart from the differences described in the following, is identical to the previously described second embodiment.

The steering column is here settable in the direction 38 of the height or inclination adjustment.

For this purpose, the clamp bolt 33 penetrates elongated holes 39 formed in support units 7" disposed on both sides of the jacket unit 3, which holes extend in the direction of the height or inclination adjustment 38. The clamp bolt 33 further penetrates at least one hole in the jacket unit 3 by which it is retained nondisplaceably in the direction 38. The converse disposition (elongated hole 39 in the jacket unit 3, round holes in the support units 7") is also conceivable and feasible.

In the opened state of the securement device 32, the steering column is adjustable in the direction of height or inclination adjustment 38, wherein the further support unit 20 becomes deformed accordingly (bending of the second securement section 30 with respect to the first securement sections 29). In the closed state of the securement device 32, the height or inclination setting is fixed in place.

In the event of a crash, the connection section 36 is torn open in the same manner as in the previously described embodiments.

Analogously, a steering column can be implemented which is adjustable in the longitudinal direction 31 as well as also in the direction 38 of height or inclination adjustment. The clamp bolt 33 could herein penetrate intersecting elongated holes in the jacket unit 3 and in the support units, wherein, for example, the elongated holes in the jacket unit 3 could be oriented in the direction of the longitudinal direction 31 and the elongated holes in the support units in the direction of height or inclination adjustment 38 and wherein also the converse disposition is feasible.

In the case of an adjustable steering column, the jacket unit 3 can be secured against a displacement in the state in which it is secured in position using all known types of clamping systems.

As already described, the securement can be under frictional and/or form closure. To increase the number of friction faces, additional lamellae can be provided in known manner. The securement under form closure can, for example, take place through toothings. The clamping-together in the secured state can take place, for example, through cam systems or rolling body systems. Activation of the clamping can be, for example, mechanical or electrical.

Diverse further modifications of the depicted embodiments are conceivable and feasible without leaving the scope of the invention. For example, the support units 7, 8 in the first embodiment could be implemented analogously to the support units 7', 7" of the second and third described embodiments, wherein the elongated holes 34, 39 can be omitted. However, the implementation for the remainder could be entirely identical (welding or other securements between the jacket unit 3 and the particular support unit could be carried out in the proximity of the vertically oriented second securement section which is connected with the first securement section via the connection section). The at least one tear line 18, 18' would then be implemented in the connection section 36 connecting the first and the second securement section.

Figure 16:
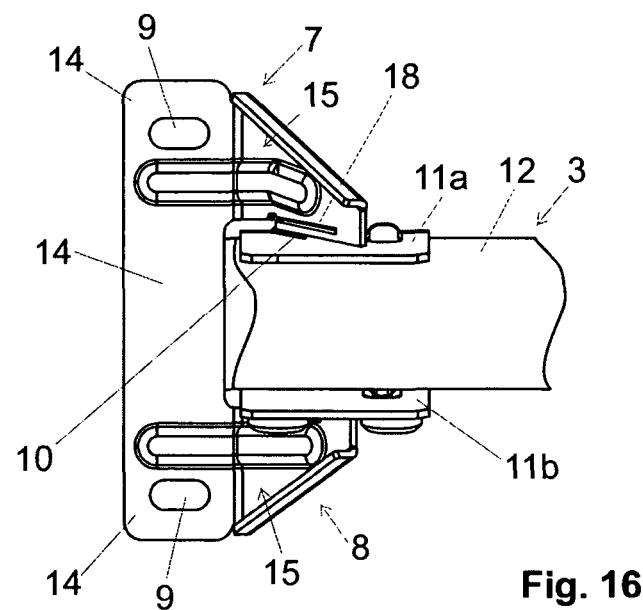
FIG. 16 shows a section of the steering column in a view from below (corresponding to line of sight A in FIG. 2) with a support unit in an alternative embodiment.
Figure 17:
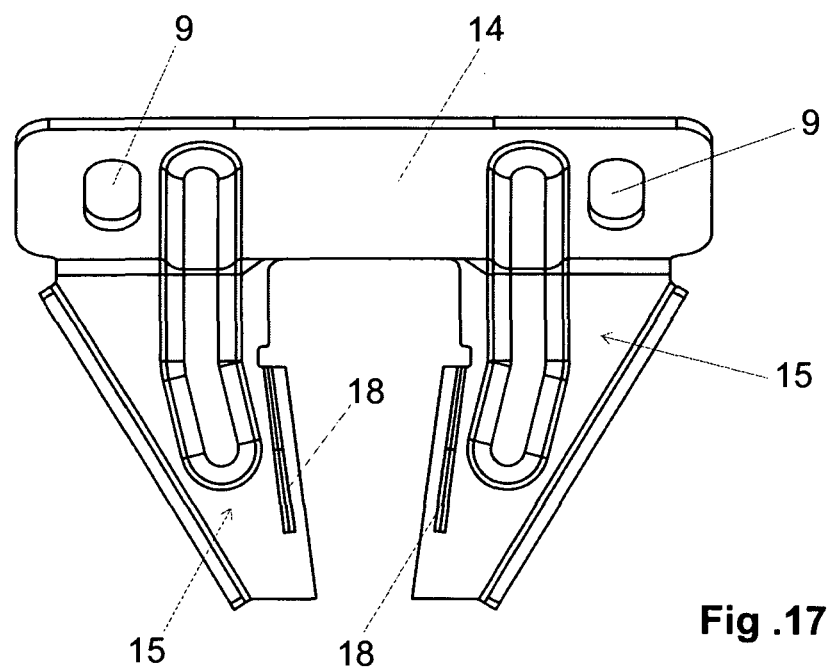
FIG. 17 is an oblique view of a support unit of a steering column of an alternative embodiment for a support unit corresponding to FIG. 16.

Instead of the two described separate support units 7, 8, 7', 7", in all described embodiments a single support unit could be provided, which on—referring to a vertical plane containing the longitudinal axis 13—opposite sides of the jacket unit 3 comprises first securement sections which are each securable on the body-stationary part 6. This single support unit in normal operation, thus when a crash has not occurred, bears again at least a portion of the weight of the steering column. In the event that the two single support units 7, 8, 7', 7" disposed on both sides of the jacket unit are formed of a single part, the second securement sections 15 to be disposed on both sides of the jacket unit 3 can correspondingly be connected with one another via the first securement section 14, preferably as a single-part sheet metal flexure stamped part, as is illustrated in FIGS. 16 and 17. This support unit could further include a connection section connecting the first securement sections with one another. This connection section connecting the first securement sections could herein be implemented in a manner similar to the second securement section 30 of the further support unit 20 depicted in FIGS. 14 and 15. However, tear lines could be implemented analogously to the tear lines 18, 18' implemented in the support units 7, 8, 7', 7" and, instead of the connecting tabs 26 the margins facing the jacket unit could be connected with the jacket unit or adjoining these margins could be second securement sections via bends or angled deflections, which [sections] are fixedly connected or are fixedly connectable with the jacket unit 3.

The formation of the tear lines 18, 18' could, for example, also be by an introduced perforation.

Different courses of tear lines 18, 18' are conceivable and feasible in order to enable the tearing with a dislocation of the jacket unit 3, wherein a torn-out flap is formed which, on the one hand, is connected with the jacket unit 3, on the other hand, is connected with a remaining portion of the support unit. For example, not only straight tear lines but also curved tear lines or such having two or more executions could be provided.

Even if in the examples the further support unit 20 is disposed further removed from the steering wheel-side end 2 of the steering spindle 1 than the first support unit 7, 8, 7', 7", it is conceivable and feasible to dispose the first support unit 7, 8, 7', 7" further away from the steering wheel-side end 2 of the steering spindle 1 than the further support unit 20.

It is also conceivable and feasible to dispose corresponding tear regions, in particular corresponding tear lines, in the jacket unit 3 itself. The at least one support unit, in this case, is connected with a portion of the jacket unit, which is disposed separated from the remaining portions of the jacket unit by a tear region. In the event of a crash, the tear region is correspondingly split and the jacket unit is dislocated with respect to the support unit and the part of the jacket unit connected with the support unit. An engineering solution of this manner is also comprised in the invention.

LEGEND TO THE REFERENCE NUMBERS

1 Steering spindle
1a, 1b, 1c Section
2 Steering wheel-side end
3 Jacket unit
4 Universal joint
5 Universal joint
6 Body-stationary part
7, 7', 7" Support unit
8 Support unit
9 Bore
10 Weld seam
11 Connecting bracket
11a, 11b Side jaws
12 Tube portion
13 Longitudinal axis
14, 14' First securement section
15, 15' Second securement section
15a Flanging
15b Connecting section
15c Base region [sic: section]
15d Connection region [sic: section]
16, 16' Main plane
17 Main plane
18, 18' Tear line
19 Tongue
20 Support unit
21 Body-stationary part
22 Second securement site
23 First securement site
24 Bore
25 Bore
26 Connection tab
27 Weld spot
28 Tear line
29 First securement section
30 Second securement section
31 Longitudinal direction
32 Securement device
33 Clamp bolt
34 Elongated hole
35 Actuation lever
36 Connection section
37 Main plane
38 Direction of height adjustment
39 Elongated hole
40 Main plane
41 Main plane

The invention claimed is:

1. A steering column for a motor vehicle, the steering column comprising:
 a steering column section adjoining the steering wheel-side end of a steering spindle;
 a jacket unit which rotatably supports the steering column section;
 a support unit which is securable on a body-stationary part of the motor vehicle and which is fixedly connected or fixedly connectable with the jacket unit,
 wherein a tear region is formed such that under the action of a displacement force in the direction of the longitudinal axis of the steering column section that exceeds a predefined detachment force, the connection of the support unit with the jacket unit or the support unit is torn open along the tear region to dislocate the jacket unit and displace the jacket unit relative to the body-stationary part,
 wherein the tear region is disposed on the support unit at a location in the force flow which occurs between the body-stationary part of the motor vehicle and the jacket unit, which holds the weight of the jacket unit before the jacket unit has been displaced relative to the body-stationary part, and
 wherein the tear region is configured such that tearing of the tear region occurs continuously at least over a large portion of a displacement path of the jacket unit with respect to the body stationary part.

2. The steering column of claim 1, wherein the jacket unit with the interconnection of the support unit remains connected with the body-stationary part at least until the action of a displacement force which exceeds a predefined break-away force higher than the detachment force.

3. The steering column of claim 1, wherein the tear region is formed by a tear line in the support unit.

4. The steering column of claim 1, wherein the tear region is formed by a rupturable securement of the jacket unit on the support unit.

5. The steering column of claim 1, wherein the support unit comprises a one first securement section which is securable on the body-stationary part, and a one second securement section which is secured in position on the jacket unit or is fixedly connectable with the jacket unit.

6. The steering column of claim 5, wherein the tear region is a tear line, and
wherein the second securement section or a connection section connecting the first securement section and the second securement section with one another includes the tear line.

7. The steering column of claim 5, wherein the first securement section and the second securement section each have a main plane which forms an angle between them.

8. The steering column of claim 5, wherein the support unit further comprises a connection section connecting the first securement section and the second securement section, and
wherein the second securement section has a main plane which is perpendicular to a main plane of the first securement section and a main plane the connection section.

9. The steering column of claim 5, wherein the first securement section includes at least one bore for securing the support unit on the body-stationary part with a securement bolt.

10. The steering column of claim 1, wherein the support unit is a unitary structure.

11. The steering column of claim 1, wherein the tear region is a tear line formed by a linear notching.

12. The steering column of claim 1, wherein the support unit is a first support unit, and the steering column further comprises a second support unit disposed on an opposite side of the jacket unit from the first support unit,
wherein the tear region is a tear line disposed on each of the first and second support units along which the support units can be torn open during a vehicle crash.

13. The steering column of claim 1, wherein the support unit is a first support unit, and the steering column further comprises a second support unit disposed on an opposite side of the first support unit from a steering wheel-side end of the steering column,
wherein the second support unit is secured on the jacket unit and is securable on a body stationary part of the motor vehicle.

14. The steering column of claim 13, wherein the second support unit is configured to deform during a dislocation of the jacket unit with respect to the body-stationary part.

15. The steering column of claim 14, wherein the second support unit is connected with a portion of the steering column via a first securement site and a second securement site,
wherein, in the event of a vehicle crash, the first securement site is detached after the displacement force exceeds the predefined detachment force, and the second securement site is retained at least until the displacement force exceeds a predefined break-away force that is greater than the detachment force.

16. The steering column of claim 1, wherein the steering column is adjustable in length and/or inclination,
wherein the steering column further comprises a securement device which has an opened state and a closed state, the jacket unit being retained nondisplaceably with respect to the support unit in the closed state of the securement device and being displaceable with respect to the support unit in the opened state of the securement device.

17. The steering column of claim 16, wherein the securement device includes a clamp bolt which presses the support unit against the jacket unit to attain a securement under friction and/or form closure of the jacket unit with respect to the support unit.

18. The steering column of claim 1, wherein the support unit extends to opposite sides of the jacket unit and the tear region is constituted by two tear lines disposed respectively on the opposite sides of the jacket unit and along which the support unit can be torn open during a vehicle crash.

* * * * *